United States Patent [19]

Siekierski et al.

[11] 4,118,661
[45] Oct. 3, 1978

[54] ELECTRICAL CIRCUIT ARRANGEMENTS PARTICULARLY THOUGH NOT EXCLUSIVELY FOR ELECTRICAL BATTERY CHARGING SYSTEMS

[75] Inventors: Wladyslaw Siekierski; Richard A. Crane, both of London, England

[73] Assignee: British Communications Corporation Limited, England

[21] Appl. No.: 780,957

[22] Filed: Mar. 24, 1977

[30] Foreign Application Priority Data

Mar. 24, 1976 [GB] United Kingdom ............... 11744/76

[51] Int. Cl.² .......................... H02J 7/04; H03K 5/00
[52] U.S. Cl. ...................................... 320/40; 320/48; 328/132; 328/151
[58] Field of Search ................................... 320/22-24, 320/39, 40, 48, 14; 307/353, 358; 328/114, 115, 117, 132, 151

[56] References Cited

U.S. PATENT DOCUMENTS

| | | | |
|---|---|---|---|
| 3,786,343 | 1/1974 | Ehlers | 320/48 X |
| 3,794,905 | 2/1974 | Long | 320/39 X |
| 3,938,021 | 2/1976 | Kosmin | 320/40 |
| 4,053,840 | 10/1977 | Baron | 328/115 X |

*Primary Examiner*—Robert J. Hickey
*Attorney, Agent, or Firm*—Leydig, Voit, Osann, Mayer & Holt, Ltd.

[57] ABSTRACT

The system described is for controlling the "rapid" charging of electric batteries whose voltage-time profile exhibits a peak at or about the point when it is fully charged, and is arranged to curtail the charging when this peak is detected. The system may be time-multiplexed to control the charging of a plurality of batteries simultaneously. The peak may be detected by comparing each successive sample of the battery voltage with the preceding sample. The system may include means for adding to each sampled voltage, before it is compared with a previously stored sampled voltage, a predetermined reference increment, whereby to avoid errors due to jitter of the sampled voltage. In such a case, means are preferably also provided for inhibiting updating of the stored sampled voltage when the comparing means detects that the next following sampled voltage increased by the said increment has fallen to the same value as the stored sampled voltage.

9 Claims, 3 Drawing Figures

ELECTRICAL CIRCUIT ARRANGEMENTS PARTICULARLY THOUGH NOT EXCLUSIVELY FOR ELECTRICAL BATTERY CHARGING SYSTEMS

BACKGROUND OF THE INVENTION

The invention relates to electrical circuit arrangements and systems for use, by way of example only, in charging or controlling the charging of electrical batteries. The batteries may be of the sealed nickel-cadmium type. In this Specification the term "battery" includes a single cell.

BRIEF SUMMARY OF THE INVENTION

According to the invention, there is provided a method of controlling the charging of an electrical battery, in which the battery voltage is monitored during the charging, and the charging is abruptly curtailed when the voltage commences to fall.

According to the invention, there is also provided a system for controlling the charging of an electrical battery, comprising means for monitoring the voltage of the battery, as it is charged, whereby to detect when the voltage begins to fall, and means responsive to detection of such a fall to abruptly curtail the charging.

According to the invention, there is further provided a system for controlling the charging of a plurality of electrical batteries, comprising sampling means having a plurality of input channels for respectively sensing the charging voltages of the plurality of batteries, control means for implementing a succession of sampling cycles during each of which the input channels are successively connected to an analogue to digital converting means whereby to produce a succession of digital voltage samples each particular to one of the batteries, memory means for storing the digital samples produced by each alternate one of the sampling cycles, digital comparing means for digitally comparing each digital sample produced during an intervening sampling cycle with the corresponding sampled voltage previously stored in the memory means whereby to produce a control signal when the comparison indicates that the voltage of a particular one of the batteries is falling, and output means responsive to the control signal for producing an output signal indicating which battery's voltage is falling and for abruptly curtailing the charging of that battery.

According to the invention, there is yet further provided a system for comparing the level of each one of a train of serial digital samples converted from an analogue signal with the level of the preceding said digital sample whereby to detect whether the analogue signal is changing level and in which there is provided sampling means for sampling the analogue signal, analogue to digital converting means for converting the analogue samples into the digital samples, storage means for storing the levels of successive digital samples, level comparison means for receiving each said digital sample of the train in turn and for comparing its level with the level of the preceding digital sample as received from the storage means so as to produce an output signal in response to a detection of difference in level between the two samples compared, and means for up-dating the level of the digital sample stored in the storage means after it has been compared by the level comparison means with the next following digital sample; and including the modification comprising means for changing the value of at least one of the digital sample voltage and the previously stored digital sample voltage with which it is to be compared by a predetermined reference increment having such polarity as to increase the later of the two digital samples relative to the earlier one thereof whereby to obviate the production of an erroneous output signal by the level comparison means in the event of jitter in the digital output of the analogue to digital converter means.

DESCRIPTION OF THE DRAWINGS

An electrical battery charging system embodying the invention, and a method according to the invention of charging electrical batteries, will now be described, by way of example only, with reference to the accompanying drawings in which.

DESCRIPTION OF PREFERRED EMBODIMENTS

The system now to be described is for controlling the "rapid" and safe charging of electric batteries whose voltage-time profile under charge exhibits a "peak" at or about the point when it is fully charged, and is arranged to terminate the rapid charging when the battery is substantially fully charged (thereafter, charging at a "trickle" charging rate may take place). An example of such a battery is a sealed nickel-cadmium battery. If charging is continued after one or more cells of the battery has reached the fully charged state, the consequent temperature rise and the negative temperature coefficient of the battery voltage are manifested as a fall in battery voltage. Therefore, as will be described, the peak referred to above is detected and used to terminate the charging process (or the rapid charging process) immediately any one cell becomes fully charged.

The system to be described is for controlling the charging of a number of separate batteries and has a plurality of inputs 5A, 5B . . . , at which input signals, representing the instantaneous voltages of the batteries being charged, are respectively received, and a plurality of outputs 6A, 6B . . . , one for each battery, at which control signals are produced for terminating the charging of the respective batteries. In a manner to be explained, the system is time-multiplexed between the plurality of batteries so as individually to control the charging of each of them.

Figure 1:
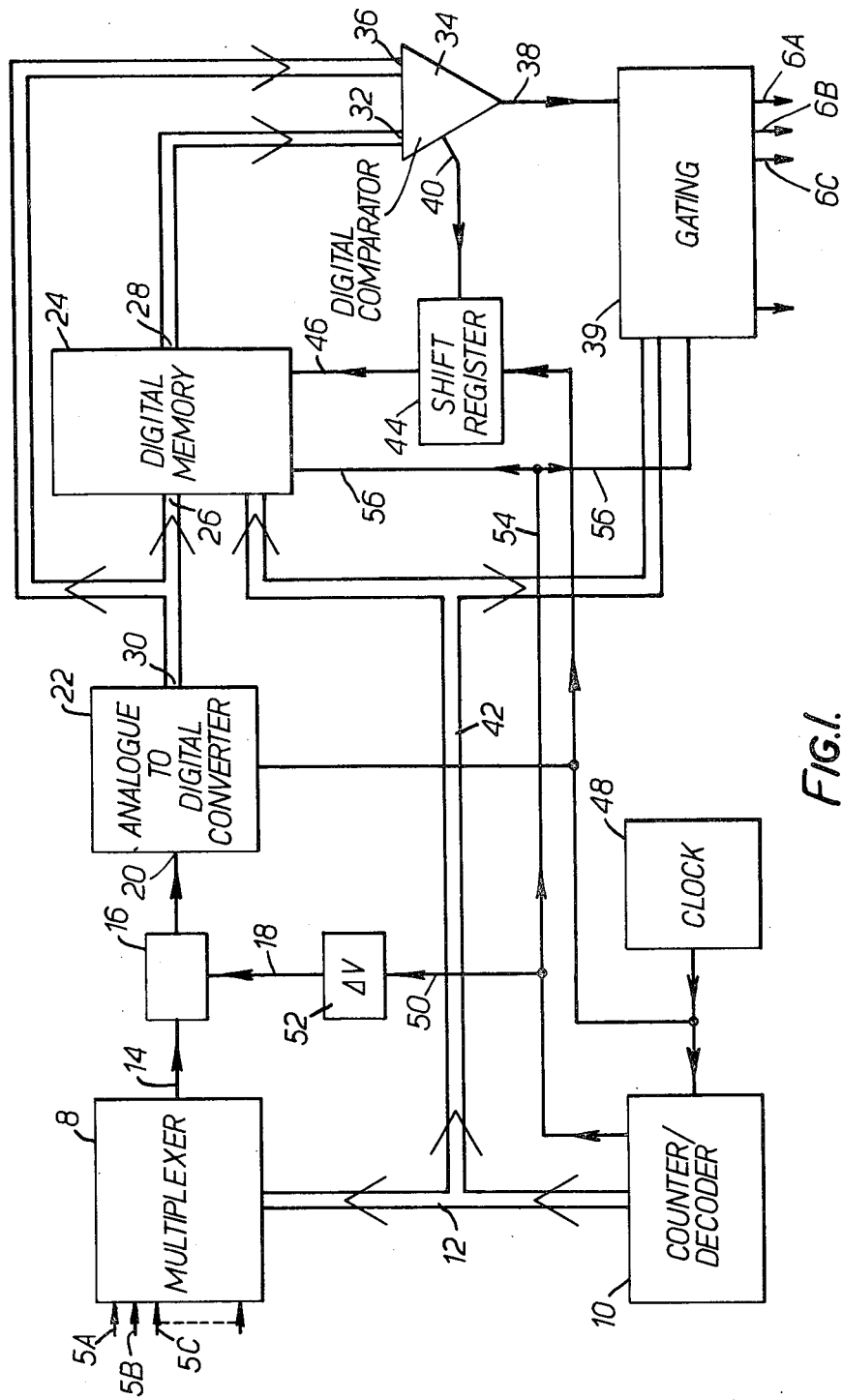
FIG. 1 is a block circuit and logic diagram of part of the system.

As shown in FIG. 1, the system includes a multiplexing unit which is controlled by a counter/decoder 10 via a channel 12. The counter/decoder 10, in stepping through its counting sequence, addresses each of the input channels 5A, 5B . . . in turn and connects each one in turn to an output 14. This output 14 is connected to one input of a summing unit 16 whose second input is received on a line 18. The output of the summing unit 16 is connected to the input 20 of an analogue to digital converter 22.

The system incorporates a digital memory 24 having an input 26 and an output 28. The memory input 26 is connected to the output 30 of the analogue to digital converter. The memory output 28 feeds a signal X to the first input 32 of a digital comparator 34. The second input 36 of the digital comparator 34 is connected to receive a signal Y from the output 30 of the analogue to digital converter 22.

The digital comparator 34 has two outputs. Its first output 38 is connected to a gating unit 39 and is energised if X is greater than Y. The second output 40 of the digital comparator 34 is energised when X = Y.

The gating unit 39 controls the outputs 6A, 6B . . . . In a manner to be explained, the signal on the output 38 is a signal for arresting charging of the particular battery being monitored by the multiplexing unit 8 at that time, and this signal is directed to the appropriate one of the output lines 6A, 6B . . . by means of address signals fed to the gating unit 39 from the counter/decoder unit 10 on a channel 42.

Channel 42 is also connected to the memory 24.

The output 40 from the digital comparator 34 is connected to the input of an n-bit shift register 44, where $n$ is the number of input channels 5A, 5B . . . and output channels 6A, 6B . . . . The serial output of the shift register 44 is connected to the INHIBIT input of the memory 24.

A clock pulse unit 48 is provided for controlling the operation of the counter/decoder 10, the analogue to digital converter 22, and the shift register 44.

A full sequence of operations of the system consists of two complete sampling cycles during each of which all the input channels 5A, 5B . . . of the multiplexer 8 are successively sampled. The counter/decoder unit 10 has a divide-by-N output 50 which controls each sequence of operations. During the first cycle of a sequence, the line 50 has a first output level which, via a reference unit 52, applies an input signal $\Delta V$ to the input 18 of the summing unit 16 and at the same time, via lines 54 and 56, holds the memory 24 in a READ mode so that it feeds an output X to the input 32 of the comparator 34. During the second cycle of the sequence, the output 50 has a different level and this causes the unit 52 to apply no signal to the summing unit 16. At the same time, lines 54 and 56 switch the memory 24 into a WRITE mode.

Figure 2:
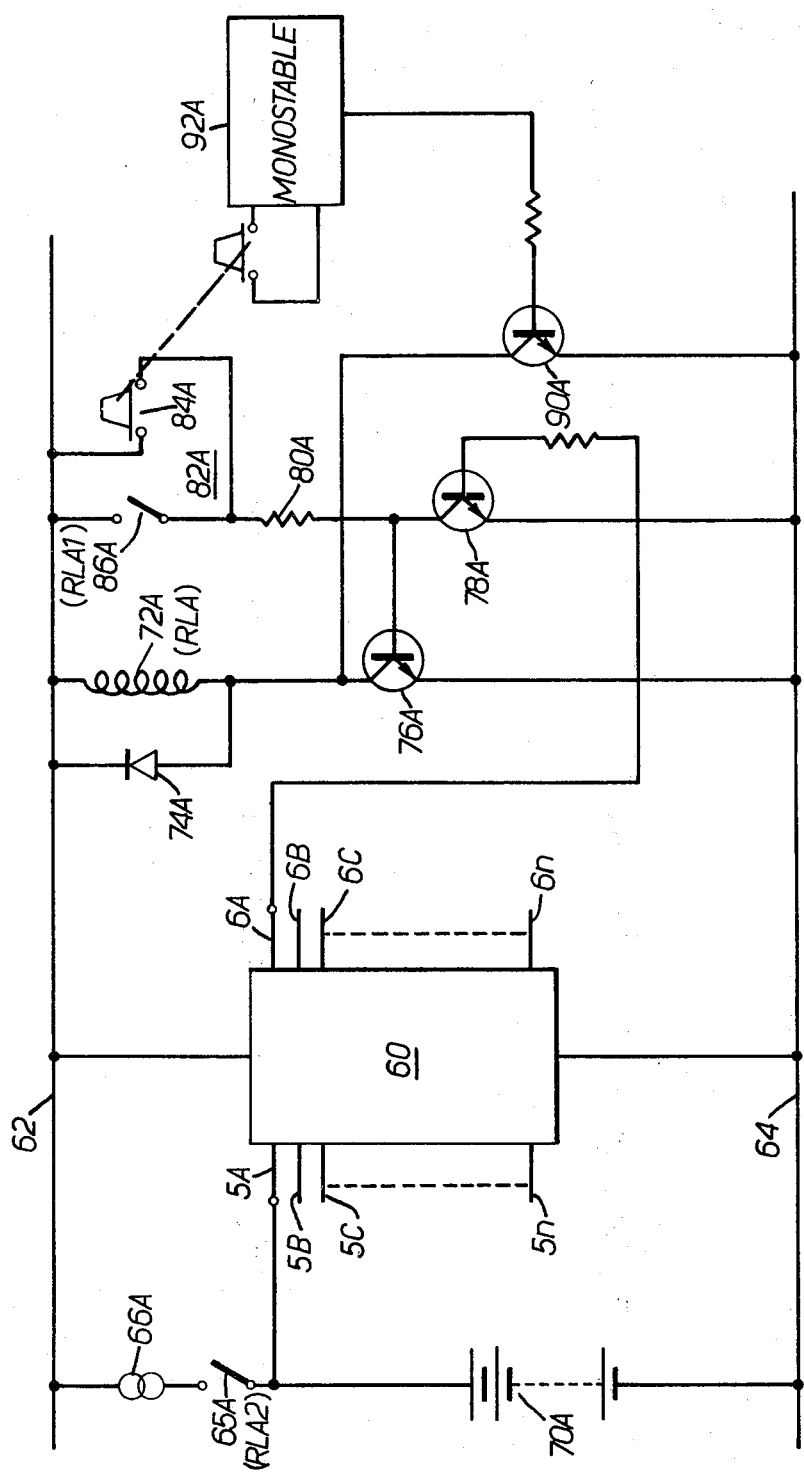
FIG. 2 is a schematic circuit diagram of the complete system.

FIG. 2 shows how the circuit arrangement of FIG. 1 is connected to the circuit of a battery being charged. In FIG. 2, the circuit arrangement of FIG. 1 is represented by the block 60 and is connected between power supply lines 62 and 64. Also connected between the power lines 62 and 64 is a series circuit comprising relay contacts 65A (RLA1), a battery charging current generator 66, and the battery 70A being charged. The input channel 5A is connected to the positive plate of the battery 70A to monitor its voltage.

The relay contacts 65A (RLA1) are controlled by a relay coil 72A (RLA) which is shunted by a protective diode 74A. The coil 72A (RLA) is connected in series between the lines 62 and 64 via an NPN transistor 76A. The conduction of the transistor 76A is controlled by means of a series circuit comprising a further NPN transistor 78A, a resistor 80A, and a parallel circuit 82A consisting of a manual push button switch 84A and relay contacts 86A (RLA2) which are controlled by the relay coil 72A (RLA). Conduction of transistor 78A is controlled by the output level on the channel 6A of the circuit arrangement 60.

Transistor 76A is shunted by a further NPN transistor 90A whose conduction is controlled by a monostable 92A initiated by the push button switch 84A (for a purpose to be described).

It will be appreciated that all the other batteries being charged by the system will have their own individual charging circuits—each of which is as shown in FIG. 2 except that the unit 60 is common to all the charging circuits and the input channels 5B, 5C . . . 5n are connected, respectively, to the positive plates of these other batteries while the output channels 6B, 6C . . . 6n are respectively connected to the bases of the transistors corresponding to the transistor 78A in the other charging circuits.

The operation of the complete system will now be described.

To initiate charging of any particular battery, the appropriate push button switch 84A (FIG. 2) is depressed and switches transistor 76A into conduction (the level on the output channel 6A being such as to allow transistor 78A to conduct at this time). Relay coil 72A (RLA) is therefore energised and latches contacts 86A (RLA2) closed, thereby maintaining the circuit operative after the push button 84A has been released.

In addition, contacts 65A (RLA1) close and charging of the battery 70A commences.

The effect of the monostable circuit 92A will be explained later.

It will be assumed that the push buttons 84A of all the other batteries in the system have also been depressed and all are being charged.

As the counter/decoder unit 10 steps through its N stages, the multiplexing unit 8 samples the voltage of each battery in turn by means of the input channels 5A, 5B . . . . It will be assumed, for example, that the counter/decoder unit 10 has addressed input channel 5A during a READ mode cycle. The multiplexing unit 8 therefore selects the channel 5A and feeds the resultant voltage V to the summing unit 16. Ignoring, for the time being, the effect of the summing unit 16, this voltage is converted into digital form in the analogue to digital converter 22 and fed as a signal Y to the input 36 of the digital comparator 34. Simultaneously (under control of the address received on channel 42), the digital memory 24 will read out, from its store, a digital value representing the digital value of the voltage of the particular battery as stored during the preceding cycle. This digital value is fed as a signal X to input 32 of comparator 34. If the comparator detects that X is less than Y, this indicates that the battery voltage is increasing and the comparator produces no output. However, if X is detected as being greater than Y, this indicates that the battery voltage is decreasing, that is, has reached a peak; line 38 is therefore energised. Under control of the address channel 42, the gating unit 39 therefore energises the output channel 6A with a negative signal. This signal switches on transistor 78A (FIG. 2) thus switching off transistor 76A and de-energising relay coil 72A. Charging of the battery therefore stops.

The counter/decoder unit 10 then selects the next input channel 5B and the same procedure is repeated.

When all the channels have been interrogated in this way, the system enters the WRITE mode. During this mode, each of the channels 5A, 5B . . . is interrogated in turn as before, but each output from the analogue to digital converter 22 is written into the appropriate location in the digital memory 24 (assuming of course that charging of the particular battery being interrogated has not previously been terminated). The line 54 ensures that the gating unit 39 is completely inhibited during this cycle. In this way, the battery voltages stored in the digital memory 24 are up-dated ready for comparison with the instantaneous battery voltages during the next READ mode cycle.

The purpose of the summing unit 16 and the shift register 44 is to deal with the problem of "jitter" in the output of the analogue to digital converter 22. Such jitter, manifesting itself as a false change in the less significant bits of the digital output, could result in the comparator 34 detecting signal Y as being less than signal X when in fact the reverse is true.

In order to deal with this problem, the unit 52 is arranged to add a signal ΔV to each measured battery voltage in turn during the READ mode cycle. Therefore, it is necessary for the voltage at any particular battery to fall by at least ΔV before the comparator 34 will energise its output line 38. However, this technique alone is undesirable because, since the comparator is always comparing the battery voltages respectively existing during two successive cycles, it follows that it is impossible for the comparator 34 to detect signal X as being greater than signal Y unless the battery voltage falls by at least ΔV during one complete sampling cycle. This makes the system sensitive only to rate of voltage fall which may be undesirable in some applications.

In order to overcome this problem, the digital comparator 34 is arranged to energise line 40 if it detects equality between signals X and Y when in a READ mode. A corresponding bit is therefore stored in the shift register 44 and is clocked through as sampling proceeds. Therefore, during the next following WRITE mode cycle, the previously stored bit will be read out on line 46 and inhibits any change in the digital value stored in the appropriate location in the memory 24. The effect of this is, therefore, that if the actual battery voltage is falling (that is, the battery voltage has reached its peak), then this will be detected during the next following READ mode cycle because the signal stored in the memory 24 will have been prevented from changing and must therefore be greater than the (falling) output from the converter 22 during the subsequent READ mode cycle. In other words, the shift register 44 prevents the reducing battery voltage from lowering the digital value stored in the memory 24 and it is no longer necessary for the battery voltage to fall by at least ΔV during a single cycle in order to produce a comparator output.

It will be appreciated that it is necessary for ΔV to be less than the resolution of the analogue to digital converter 22.

When any particular battery charging circuit (FIG. 2) is switched into the system by operation of its push button switch 84, the memory 24 may not be storing correct data (for example, it may have retained data relating to a battery which has previously been charged and then removed). Unless care is taken, therefore, the system could initially respond incorrectly. To prevent this, the monostable 92 is provided which holds transistor 90 conductive for an initial period sufficient to allow the memory 24 to become updated with the correct data, and positively prevents de-energisation of relay coil 72 during this period.

The system described is advantageous in that it allows consistent and reliable "rapid" charging of batteries to substantially full capacity. Its improved accuracy avoids the wasted battery capacity which occurs in the case of consistent undercharge, and the damage to the life of the battery and the safety risks which can be produced in the case of consistent overcharge. The method and system are not unduly temperature sensitive and batteries having widely different characteristics can be charged together. It is not necessary for a multi-cell battery to have closely matched cells.

The digital design of the system enables much more satisfactory storage of the battery voltage than would be the case with analogue methods of storage. Furthermore, digital techniques are conducive to the application of multiplexing, allowing much more economic usage of the components.

When the system has terminated charging of any particular battery in the manner described, trickle charging of that battery may then be automatically commenced so as to maintain the battery in its fully charged state until it is required for use.

Figure 3:
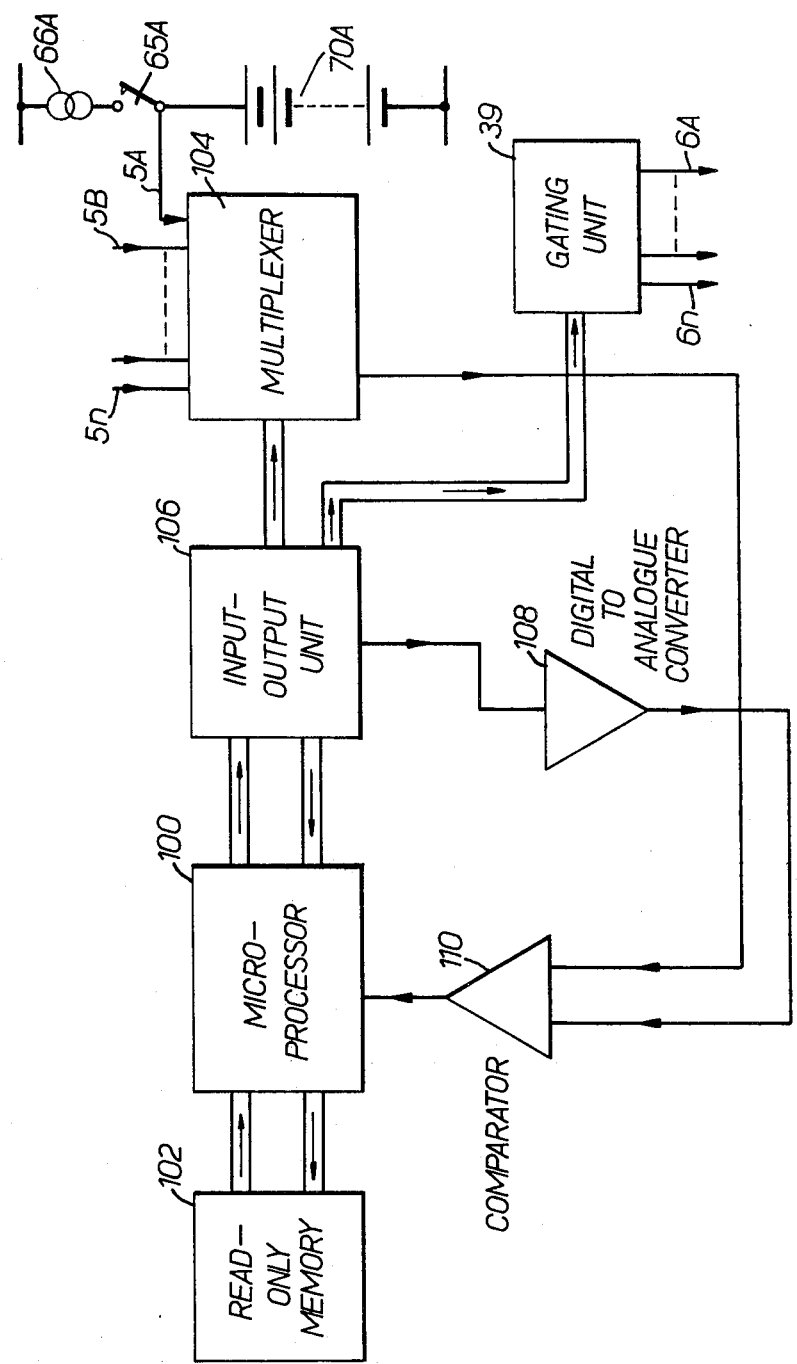
FIG. 3 is a block circuit diagram showing how the system is implemented, at least in part, by means of a microprocessor.

In a modified form of the system shown in FIG. 3 in which parts corresponding to parts in FIGS. 1 and 2 are correspondingly referenced, the functions of at least some of the components are carried out under control of a microprocessor (M.P.U.) 100. In such a modified system, a program for the microprocessor may be stored in a read-only-memory (R.O.M.) 102 as Firmware and used to instruct the M.P.U. 100 to perform the necessary functions.

The M.P.U. controls a multiplexer unit 104 via an input/output unit 106, and the multiplexer unit 104 has a plurality of inputs each connected to respond to the voltage across a particular one of the batteries (e.g. battery 70A as shown).

By means of the multiplexer unit 104, the M.P.U. 100 detects each battery voltage and carries out an analogue to digital conversion on the voltage. This is accomplished by stepping the output of a digital to analogue converter 108 until a comparator 110 indicates that it is equal to the analogue input from the particular channel.

The digital conversion may then be examined in the M.P.U. 100 to determine whether the battery voltage is outside predetermined upper and lower limits (say, 16 volts and 4 volts respectively) and if so the M.P.U. allows only a trickle charge rate to this channel. Otherwise the M.P.U. will activate the 'high' rate charging current. This channel is re-examined at regular intervals and the above tests repeated, either to switch on or to switch off the 'high' rate current to the channel.

When the high rate is selected, an algorithm is invoked in the M.P.U. 100 whereby the channel and all other channels are interrogated at regular intervals via the multiplexer unit 104. The result of the present analogue to digital conversion on a given channel is compared with the past conversions and used to make the decision to continue or to discontinue the 'high' rate charge on the channel being examined. Discontinuance of high rate charging is carried out by the gating unit 39.

The M.P.U. may be arranged to be able to detect the removal of a bettery from a given channel and to reset and restore the channel when the battery (or other battery) is replaced. By this means, no switches for initiating charging are required.

It should be appreciated that the arrangement described for avoiding errors due to jitter on the output of the digital to analogue converter, is not restricted to use in a battery charging system, but may be used generally—that is, where a digital to analogue converter is converting any analogue voltage into digital form for comparison with a previously stored digital value. In other words, the invention extends to the provision of an arrangement for adding a predetermined reference increment to each one of successive digital samples, before it is compared with the value of a previously stored one of the samples, whereby to avoid errors due to jitter of the digital value. In such a case, means (such as, but not limited to, the shift register 44) are preferably avoided for inhibiting up-dating of the stored samples when the comparing means detects that that sample has the same value as the next following sample increased by the said increment.

It will be appreciated that the adder 16 can be replaced by a subtracting unit for subtracting a predetermined increment from each digital sample stored in the memory 24 (until inhibited as by the shift register 44).

What we claim is:

1. A system for controlling the charging of an electrical battery, comprising sampling means connected to the battery for periodically sampling the voltage of the battery, as it is charged, means connected to convert each sampled voltage into digital form, means for storing the successive sampled voltages after conversion into digital form, comparing means for comparing each sampled voltage after conversion into digital form with a previously stored said sampled voltage whereby to detect when the sampled voltage is less than the previously stored sampled voltage and thereby to detect when the voltage of the battery begins to fall, means connected to the comparing means and responsive to detection of such a fall to abruptly curtail the charging, and means to obviate the effect of jitter in the analogue to digital conversion comprising means for changing the value of at least one of each sampled voltage and the previously stored sampled voltage with which it is to be compared by a predetermined reference increment having such a polarity as to increase the later of the two sampled voltages relative to the earlier one thereof.

2. A system according to claim 1, including means for inhibiting up-dating of the stored sampled voltage in the event of its comparison with the next following sampled voltage (after at least one of them has been changed by the said predetermined increment) indicating that equality has been reached.

3. A system according to claim 1, including multiplexing means for time-multiplexing the sampling of the voltages of a plurality of batteries onto a single channel comprising the storing means, the analogue to digital conversion means, and the comparing means, and means for time-multiplexing the storing means, the analogue to digital conversion means, and the comparing means in synchronism with the sampling means.

4. A system according to claim 1, including means operative in response to the abrupt curtailment of the charging of the said battery to institute charging of the battery at a reduced rate.

5. A system for controlling the charging of a plurality of electrical batteries, including sampling means having a plurality of input channels respectively connected to sense the charging of voltages of the plurality of batteries, analogue to digital converting means, control means for implementing a succession of sampling cycles during each of which the input channels are successively connected to the analogue to digital converting means whereby to produce a succession of digital voltage samples each particular to one of the batteries, memory means connected to the analogue to digital converting means for storing the digital samples produced by each alternate one of the sampling cycles, digital comparing means connected to the analogue to digital converting means and to the memory means for digitally comparing each digital sample produced during an intervening sampling cycle with the corresponding sampled voltage previously stored in the memory means whereby to produce a control signal when the comparison indicates that the voltage of a particular one of the batteries is falling, output means responsive to the control signal for producing an output signal indicating which battery's voltage is falling and for abruptly curtailing the charging of that battery, adding means interposed between the sampling means and the analogue to digital converting means, and means for energising the adding means during each said intervening sampling cycle to add to each voltage sampled during that cycle a predetermined reference increment, whereby to obviate the production of an erroneous control signal by the digital comparing means in the event of jitter in the digital output of the analogue to digital converting means between successive cycles.

6. A system according to claim 5, comprising means connected to the comparing means and to the memory means and operative, in response to the comparing means detecting equality between a sampled voltage increased by the said increment and the sampled voltage in the memory means for the same battery, to prevent subsequent change in that stored sampled voltage during the next following alternate sampling cycle.

7. In a system for comparing the level of each one of a train of serial digital samples converted from an analogue signal with the level of the preceding said digital sample whereby to detect whether the analogue signal is changing level and in which there is provided sampling means for sampling the analogue signal, analogue to digital converting means for converting the analogue samples into the digital samples, storage means for storing the levels of successive digital samples, level comparison means for receiving each said digital sample of the train in turn and for comparing its level with the level of the preceding digital sample as received from the storage means so as to produce an output signal in response to a detection of difference in level beween the two samples compared, and means for up-dating the level of the digital sample stored in the storage means after it has been compared in the level comparison means with the next following digital sample; the improvement comprising means for changing the value of at least one of each digital sample and the previously stored digital sample with which it is to be compared by a predetermined reference increment having such polarity as to increase the later of the two digital samples relative to the earlier one thereof whereby to obviate the production of an erroneous output signal by the level comparison means in the event of jitter in the digital output of the analogue to digital converter means.

8. The system according to claim 7, further including means connected to the level comparison means and to the up-dating means and operative, in the event of the comparison of a stored digital sample with the next following digital sample (after at least one of them has been changed by the said predetermined increment) indicating that equality has been reached, to inhibit the up-dating means whereby the storage means presents an unchanged level to the comparison means for the next comparison.

9. A system according to claim 1, including a microprocessor comprising the sampling means, the analogue to digital converting means, the storing means, the comparing means, and the means to obviate the effect of the said jitter.

* * * * *